United States Patent [19]

Lammerting et al.

[11] 4,042,540

[45] Aug. 16, 1977

[54] PROCESS FOR THE MANUFACTURE OF HIGHLY ELASTIC SOFT POLYURETHANE FOAMS

[75] Inventors: Helmut Lammerting, Herbede; Rolf-Dieter Langenhagen, Hattingen-Niederwenigern; Gerd Rossmy, Haltern; Peter Zäske, Essen-Bredeney, all of Germany

[73] Assignee: Th. Goldschmidt AG, Essen, Germany

[21] Appl. No.: 607,913

[22] Filed: Aug. 26, 1975

[30] Foreign Application Priority Data

Aug. 30, 1974 Switzerland .............................. 11814/74

[51] Int. Cl.$^2$ ............................................. C08G 18/14
[52] U.S. Cl. ........................ 260/2.5 AH; 260/2.5 AP
[58] Field of Search ..................... 260/2.5 AH, 2.5 AP

[56] References Cited

U.S. PATENT DOCUMENTS

| | | |
|---|---|---|
| 3,078,239 | 2/1963 | Gmitter ......................... 260/2.5 AH |
| 3,139,410 | 6/1964 | Wild et al. ..................... 260/2.5 AH |
| 3,741,917 | 6/1973 | Morehouse .................... 260/2.5 AH |
| 3,839,384 | 10/1974 | Morehouse .................... 260/2.5 AH |
| 3,890,255 | 6/1975 | van Leuwen et al. ......... 260/2.5 AP |
| 3,925,266 | 12/1975 | Fabris et al. .................... 260/2.5 AP |

FOREIGN PATENT DOCUMENTS 235,812  7/1959  Australia ....................... 260/2.5 AH

*Primary Examiner*—Eugene C. Rzucidlo
*Attorney, Agent, or Firm*—Toren, McGeady and Stanger

[57] ABSTRACT

In the disclosed foaming process for manufacturing soft polyurethane foams on the basis of polyethers containing at least two hydroxy groups, the foaming is carried out in the presence of selected low-molecular weight, low-viscosity methylpolysiloxanes which do not cause disorders in the boundary regions of the foam or shrinkage.

13 Claims, No Drawings

PROCESS FOR THE MANUFACTURE OF HIGHLY ELASTIC SOFT POLYURETHANE FOAMS

BACKGROUND OF THE INVENTION

1. Field of the Invention

The invention relates to a process of manufacturing soft polyurethane foams on the basis of polyethers. Such foams have recently attracted increasing attention as "cold foams" or "high resilience foams (HR foams)".

2. Description of the Prior Art

There are many process variations for producing HR foams which are extensively described in the chemical literature. Polyethers, crosslinkers and polyisocyanates may be varied as much as the auxiliaries used, such as catalysts, emulsifiers, propellants, etc. Common to these processes is the fact that, as the result of early crosslinking of the polyurethane foam, no polysiloxane-polyether copolymers need be used as stabilizing additive to prevent collapse of the foam. As a matter of fact, the use of the indicated stabilizing additives must oftentimes be avoided since the foam stabilizers — which are essential in the manufacture of "hot foams" that have hitherto dominated the field — lead in cold foams to an intolerable shrinkage tendency and frequently, to an equally undesirable uniformity of the pore structure of the foam.

Many papers have been published about the state of the art, representative examples of which are: German Offenlegungsschrifts Nos. 2,221,811, 2,246,400, 2,337,140 and 2,356,443, as well as various articles published in the Journal of Cellular Plastics, such as January/February issue 1972, pages 35 to 44; January/February issue 1973; pages 19 to 24; March/April issue 1973, pages 92 to 98 and May/June issue 1973, pages 134 to 138.

The invention process is primarily concerned with foam materials which, in principle, can be manufactured without the addition of any organosiloxane. The skilled art worker is aware that such foam materials can be produced by achieving a relatively high incidence of crosslinking in the polyurethane structure, up to the time of "opening" of the foam material. From practical experience and from the literature, different methods are known for achieving this degree of crosslinking: for example, through the use of a polyisocyanate with more than two isocyanate groups per molecule, through the use of highly-reactive polyether polyols which preferably were provided with primary hydroxy groups by incorporating ethylene oxide units, preferably at the chain end, as well as by the additional use of low-molecular weight polyhydroxy compounds as, for example, glycerol, trimethylolpropane, trimethylolethane, triethanolamine, etc. These measures can be used individually or in combination. In any case, it is important that the crosslinking of the polyurethane foam material takes place so quickly, that, on opening of the foam material, there is no longer a strong collapse tendency and that a uniformity of pore structure is achieved, which is adequate but not excessive, for the application purposes, without having to use a polysiloxane derivative as additive. Foams, which satisfy these characteristics, have such great advantages in regard to physical data and flammability, that they have captured an appreciable portion of the market in recent times. However, such foams, which are usually manufactured as molded foams, exhibit so great a disorder of the foam structure in the boundary or edge zones (large bubbles or contraction cavities), that their practical value is greatly diminished.

Special organosiloxanes have already been proposed as additives for such cold foams. These organosiloxanes are intended to be suitable for eliminating the disorders (See German Offenlegungschrifts Nos. 2,221,811, 2,377,140 and 2,246,400). However, market products, that are based on this principle, still have disadvantages, to wit, poor reproducibility, a relatively high applications concentration and, in some cases, an insufficiently calibrated ratio of regulating effect in the boundary zones of the foam to shrinkage tendency.

SUMMARY OF THE INVENTION

The present invention has the primary object of developing more effective and more reproducible additives for use in the manufacture of the indicated foam systems with a lesser tendency to overdosage difficulties. This objective is achieved by selecting certain methylpolysiloxanes. The use of low-viscosity methylpolysiloxanes as additives for cold foams is known. Their disadvantages are however described in German Offenlegungsschrift No. 2,356,443 as resulting in an intolerable tendency to shrink. The effect of such methylpolysiloxanes, which is also confirmed in this Offenlegungschrift, leading to a refinement of foam structure, is also a disadvantage from the point of view of the object of the invention since it is known from in any practical tests that a slightly irregular pore structure, which is characteristic for cold foams, is a good prerequisite for optimum properties of foam materials for upholstery purposes.

In contrast to the known state of the art, it was surprisingly ascertained that a definite selection, which must be strictly adhered to, of low-molecular weight methylpolysiloxanes, leads to additives which fully satisfy the requirements described.

The organopolysiloxanes, to be used in accordance with the invention, can be depicted by formula I:

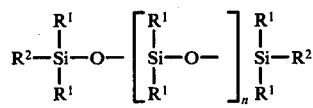

in which
R¹ = the same or different, hydrocarbon groups — which may be substituted-and which are free of groups, such as —OH, —SH, =NH, that easily enter addition reactions with isocyanate. However, preferably at least 90% of the R¹ groups are methyl groups. Especially preferred are compounds in which all the R¹ groups are methyl groups. Examples of other R¹ groups are: n- or iso-alkyl with 2 to 18 C atoms, aryl, especially phenyl, vinyl, halogenalkyl, such as bromomethyl, chloromethyl, 2-chloroethyl, 3-chloropropyl, acetoxypropyl, 2-cyanoethyl and 3-cyanopropyl or hydrogen. One R¹ group per average molecule can also be replaced by the bridging or branching $O_{0.5}$ group. This results then in the saturation of the residual valence by the corresponding valence of another molecule.

R² = R¹ or OR³,
where R³ = alkyl, aryl, alkylaryl or $[C_mH_{2m}O]_pR^4$
where R⁴ represents a low-molecular weight alkyl, $m$ = 2 to 4 and $p$ is so chosen, that the molecular weight of the total $R^3$ group does not exceed 400 and preferably does not exceed 150.

Compounds in which $R^2 = R^1 = -CH_3$ or low-molecular weight ($C_1$- to $C_6$-, preferably a $C_1$-to $C_4$-) alkoxy are preferred. It is also possible to have a mixture of $R^1$- and alkoxy groups in one molecule or in the molecule mixture.

$n = 2$ to 10, preferably 2 to 8. Especially preferred are organopolysiloxanes which contain 6 to 8 silicon atoms in the molecule. If one of the $R^1$ groups in the molecule is 0 1/2 then the total number of silicon atoms in the molecule must not exceed 12 and preferably should not be greater than 8.

Deviating from the state of the art, the molecular weight of the inventive organopolysiloxanes is not to be understood as an average molecular weight. The values of $n$, mentioned in the definition of the formula, may not be exceeded. If high-molecular weight products are present at all, they can, in any case, be so in only very small amounts. The organopolysiloxanes, to be used in accordance with the invention, can be used as single-molecule type materials or as mixtures. For such mixtures however, as has already been stated, the inventive limit value of $n$ must not be exceeded even by individual components of the mixture.

For the use of the organopolysiloxanes in accordance with the invention, it is particularly important that individual species, with higher $n$ values than those given in the above definition, are present in only very small concentration. Preferably, the content of such higher homologues is less than 0.5% by weight. High-molecular weight siloxanes ($n$ is larger than 20) must in any case be separated out from the organopolysiloxanes to be used in accordance with the invention since they can lead to defoaming tendencies. A simple distillation, in which aerosol parts may enter the distillate, is not adequate for insuring these conditions. If such high-molecular weight siloxanes are present in the starting mixture used for the preparation of the organopolysiloxane fraction conforming to the invention, the use of fractionation attachments such as demisters, is required. The effectiveness of the inventive siloxanes, is very much dependent on the chain length of the siloxane. Generally, the chain length increases with increasing value of $n$. However, there is a value of $n$ which, if exceeded, leads to only a slight increase in improvement in regard to preventing boundary disorders on the one hand and, on the other, to a noticeable increase in the tendency for cell refinement and shrinkage of the foam material. This value of $n$ corresponds to molecules with about 9 silicon atoms. This limit can be displaced somewhat to higher values by incorporating $R^1$ and $R^2$ groups which are larger than the methyl group.

The applications concentrations of the siloxanes to be used in accordance with the invention depend, very much, as is clear to every experienced foam technologist, on the details of the foam formulation, the mixing conditions, the foaming apparatus and the shape of the mold, in which the foaming is taking place. However, it is possible to characterize well the applications concentration by standard or guide values. Compounds of formula I, with 4 silicon atoms per molecule, are used at 0.1 to 2% by weight, compounds with 5 silicon atoms at 0.03 to 1.2% by weight, compounds with 6 silicon atoms at 0.01 to 0.35% by weight, and compounds with 7 and more silicon atoms at 0.003 to 0.15% by weight, calculated on the amount of polyether. Preferred are the ranges of 0.2 to 1.5, 0.06 to 0.75, 0.02 to 0.15 and 0.006 to 0.08% by weight for the above indicated compounds with the number of silicon atoms in the order mentioned above. If a larger portion of the $R^1$ groups, in the compounds I conforming to the invention, is not the methyl group and/or a larger part of $R^2$ groups not the methyl or a low-molecular weight alkoxy group then the concentrations of these compounds must be increased for application purposes. Such compounds are, however, not preferred. At very low applications concentrations, a mixture of active material with solvents, softeners, foaming polyethers and other auxiliaries is recommended. The inventive siloxanes are, as has already been mentioned, used as pure-chain oligomers or as oligomer mixtures. The applications concentration of such mixtures can readily be calculated from the above data, taking into consideration the content of the individual oligomers. Once again, the very great importance of excluding the higher molecular weight siloxanes must be pointed out here. Siloxanes with lower n values than permitted according to the invention, can however be used in a mixture without any objection. Since they have only a weak activity, they need generally not be considered in calculating the applications concentration.

The pure-chain oligomers, corresponding to formula I, can be obtained from the mixtures by fractional distillation. For this purpose, it is expedient to start with mixtures that already contain a higher proportion of components to be isolated than is present in the statistical equilibrium distribution. Such mixtures are obtained, for example, by telomerization reactions of the type:

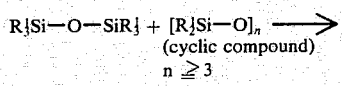
(cyclic compound)
$n \geq 3$

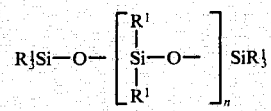

Such a telomerization step is generally obtained in equilibration reactions with acid catalysts such as sulfuric acid, organosulfonic acids, $FeCl_3.HCl$, acid-active soil, etc., and can easily be arrested by stopping the reaction, for example, by neutralizing the catalyst. By these means, a siloxane mixture is obtained, which contains more than 40% by weight of the desired oligomers. This represents a very favorable prerequisite for the economic isolation of the highly active compounds that conform to the invention.

Other telomerizations lead to chlorosiloxanes, which can be converted by known procedures to alkoxysiloxanes to be used in accordance with the invention. Such chlorosilosiloxanes are obtained according to the following reaction equations, the conditions for which are known from prior art publications:

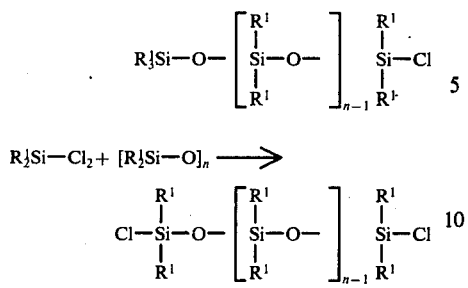

$$R_3^1Si-Cl_2 + [R_2^1Si-O]_n \longrightarrow$$

$$Cl-\underset{\underset{R^1}{|}}{\overset{\overset{R^1}{|}}{Si}}-O-\left[\underset{\underset{R^1}{|}}{\overset{\overset{R^1}{|}}{Si}}-O-\right]_{n-1}\underset{\underset{R^1}{|}}{\overset{\overset{R^1}{|}}{Si}}-Cl$$

When using an oligomer mixture for the inventive purpose it is very important, for reasons of good reproducibility, to keep the composition of the mixture constant from batch to batch. This is best achieved by using an equilibrated siloxane system from which the undesirable portions, whose molecular weight is too high, has been separated by distillation as described above. In producing an organopolysiloxane mixture which is to be used in accordance with the invention and which has $OR^3$ groups as $R^2$ residues, it is advantageous to undertake the equilibration of the corresponding chlorosiloxanes and subsequently to convert the equilibrated mixture, by reaction with $R^3OH$ into the siloxanes to be used in accordance with the invention.

In addition to compounds I which are to be used in accordance with the invention, it is also possible to use other organopolysiloxanes which have become known as cold-foam stabilizers, if the fine-celled nature of the foam material is to be increased or if the stability of the foam towards collapse is to be improved. It should be pointed in this connection that foam formulations, which show little collapse on free foaming when the inventive additives are employed, can be used directly in a closed mold without the addition of a further stabilizing agent.

The use of compounds I in accordance with the invention is to be illustrated further by means of the following Examples, it being understood that these Examples are given by way of illustration and not by way of limitation.

Foam formulations were foamed which did not tend to slump markedly or to collapse, and which produced a cell fineness adequate for practical purposes, even without the addition of the substance to be used in accordance with the invention. By means of the following itemized Examples, it is shown that disorders in the boundary zones of the foam structure, which occur to a marked degree without the addition of a surface-active material, are eliminated by the use of the inventive substance without noticeable shrinkage of the foams.

In order to circumvent the technical difficulties of measuring out very small amounts, the siloxane was not measured out directly but used in a 6% mixture in polyether in all experiments in which the siloxane was employed in smaller amounts than 0.1 parts by weight relative to 100 parts by weight of foaming polyol. The quantities given in the examples do not however refer to these mixtures, but are recalculated on the basis of effective substance.

EXAMPLE I

A mixture, consisting of
100.00 parts by weight of a glycerol-based polyoxyalkylenetriol that is composed of 84% propylene oxide and 16% ethylene oxide and has an OH number of 35,
0.70 parts by weight triethylenediamine (33% in dipropylene glycol),
0.20 parts by weight bis-1,1-dimethylaminodiethylether
3.00 parts by weight glycerol
3.00 parts by weight water
10.00 parts by weight monofluorotrichloromethane and
0.02 to 1.50 parts by weight of a siloxane of formula I which is to be used in accordance with the invention, the actual amounts by weight of the siloxanes of formula I that were used, being given below in the experimental series (a) and (b), is reacted with 58.00 parts by weight of a mixture consisting of
40.00 parts by weight of crude diphenylmethanediisocyanate and
60.00 parts by weight of toluylenediisocyanate (20% 2.6 and 80% 2.4 isomers mixture).

In carrying out the experiment, the above itemized reaction mixture was pre-stirred in a breaker, without addition of the monofluorotrichloromethane and the isocyanate mixture, for 45 seconds at a rate of 1000 revolutions/minute with a wing stirrer of 70 mm diameter. The monofluorotrichloromethane was then added and the stirring continued at the same rate of stirring for a further 15 seconds. After addition of the isocyanate mixture, the rate of stirring was increased to 2500 revolutions/ minute and the stirring was continued at this rate for a further 7 seconds. The reaction mixture was poured into a paper-lined hollow receptacle whose dimensions were 270 × 270 × 270 mm. An open-celled, elastic foam body was formed, which was cut open after 24 hours storage and tested for boundary and bottom disorders, as well as shrinkage behavior.

In accordance with the invention, a siloxane of formula I was employed in which
a. $R^1 = -CH_3$ and $R^2 = -CH_3$
b. $R^1 = -CH_3$ and $R^2 = -O-C_3H_7$.

In the following, "N" is the total number of Si atoms ($N = n + 2$).

a. Siloxanes of formula I, with N = 4 to N = 8, were examined. For the complete removal of boundary and bottom disorders, it was sufficient to use
1.5 parts by weight when employing a siloxane with N = 4
0.5 parts by weight when employing a siloxane with N = 5
0.15 parts by weight when employing a siloxane with N = 6
0.05 parts by weight when employing a siloxane with N = 7 and
0.02 parts by weight when employing a siloxane with N = 8.

In all cases, a barely noticeable shrinkage tendency could be detected.

b. Siloxanes of formula I, with N = 4 to N = 7, were examined. For the complete removal of boundary and bottom disorders, it was sufficient to use
0.5 parts by weight when employing a siloxane with N = 4
0.2 parts by weight when employing a siloxane with N = 5
0.06 parts by weight when employing a siloxane with N = 6 and 0.02 parts by weight when employing a siloxane with N = 7.

In all cases, a barely noticeable tendency to shrink could be detected.

For comparison, foaming was carried out with a conventional commercial product. With less than 0.75 parts by weight of this product, an adequate removal of the boundary disorders could not be achieved. The shrinkage with 0.75 parts by weight of this conventional commercial substance must be described as noticeable.

It must still be taken into consideration that the amounts used here can be reduced in machine foaming by up to ⅓, depending on the type of machine.

EXAMPLE 2

A mixture, consisting of 100.00 parts by weight of a glycerol-based polyoxyalkylenetriol that is composed of 84% propylene oxide and 16% ethylene oxide and has an OH number of 28, 1.00 parts by weight triethylenediamine (33% solution in dipropylene glycol), 3.00 parts by weight triethanolamine 3.00 parts by weight water, 10.00 parts by weight monofluorotrichloromethane and 0.02 to 4.00 parts by weight of a siloxane of formula I which is to be used in accordance with the invention, the actual amounts by weight of the siloxanes of formula I that were used, being given below in the experimental series marked (c) and (d), is reacted with 47.6 parts by weight of a partially cross-linked polyisocyanate of NCO number 39, that is based on toluylenediisocyanate.

The experiments were carried out under conditions that were identical with those in Example 1.

In accordance with the invention, a siloxane of formula I was used in which c. $R^1 = -CH_3$ and $R^2 = -CH_3$ d. $R^1 = -CH_3$ and $R^2 = -O-C_3H_7$.

c. Siloxanes of formula I with N = 4 to N = 8 were examined. For the complete removal of boundary and bottom disorders, it was sufficient to use 2.00 parts by weight when employing a siloxane with N = 4, 0.60 parts by weight when employing a siloxane with N = 5

0.15 parts by weight when employing a siloxane with N = 6

0.05 parts by weight when employing a siloxane with N = 7 and 0.02 parts by weight when employing a siloxane with N = 8.

In all cases, no noticeable shrinkage could be detected d. Siloxanes of formula I, with N = 4 to N = 7, were examined. For the complete removal of boundary and bottom disorders, it was sufficient to use 0.75 parts by weight when employing a siloxane with N = 4, 0.25 parts by weight when employing a siloxane with N = 5

0.06 parts by weight when employing a siloxane with N = 6 and 0.02 parts by weight when employing a siloxane with N = 7.

In all cases, no noticeable shrinkage could be detected.

For comparison, foaming was carried out with a conventional commercial product. With less than 0.75 parts by weight, an adequate removal of boundary disorders could not be achieved. A noticeable shrinkage of the molded body could not be detected here.

It must be taken into consideration that the amounts used here can be reduced in machine foaming by up to ⅓, depending on the type of machine.

EXAMPLE 3

A mixture consisting of 100.00 parts by weight of a polyoxyalkylenetriol, grafted with acrylonitrile and styrene, that has an OH number of 33

0.60 parts by weight triethylenediamine (33% solution in dipropyleneglycol), 2.00 parts by weight triethanolamine 0.15 parts by weight bis-1,1-dimethylaminodiethylether 2.00 parts by weight water and 0.02 to 4.00 parts by weight of a siloxane of formula I which is to be used in accordance with the invention, is reacted with 27.10 parts by weight toluylenediisocyanate (20% 2,6 and 80% 2,4 mixture of isomers).

The experiment was carried out under conditions, identical with those in Example 1.

With respect to elimination of boundary disorders and shrinkage tendency, te foaming results with the siloxanes to be used in accordance with the invention and, for comparison, with a conventional commercial product, correspond in all respects with the results of Example 2 (c) and (d).

EXAMPLE 4

On the basis of the basic formulation below, foamings were carried out according to the method described in Example 1:

100.00 part by weight polyetherpolyol (OH number 35, proportion of primary OH groups ca. 70–75%)

3.00 parts by weight water 0.70 parts by weight of a 33% solution of triethylenediamine in dipropyleneglycol 2.00 parts by weight glycerol 0.40 parts by weight dimethylethanolamine 10.00 parts by weight monofluorotrichloromethane 54.00 parts by weight isocyanate mixture, consisting of 40% diphenylmethanediisocyanate and 60% toluylenediisocyanate (20% 2,6 and 80% 2,4 isomer mixture), x parts by weight siloxane according to formula I Two different methylsiloxanes were used as siloxane according to formula I. Their composition, as determined by gaschromatographic analysis, was as follows:

|        | Mixture 1 | Mixture 2 |
|--------|-----------|-----------|
| n = 3  | 21.5%     | —         |
| n = 4  | 31.3%     | —         |
| n = 5  | 27.6&     | —         |
| n = 6  | 19.4%     | 27.0%     |
| n = 7  | 0.2%      | 31.1%     |
| n = 8  | —         | 20.1%     |
| n = 9  | —         | 12.0%     |
| n = 10 | —         | 6.6%      |
| n = 11 | —         | 2.7%      |
| n = 12 | —         | 0.5%      |

Mixture I was dosed with 0.04, 0.08 and 0.12 parts by weight respectively. All the resulting foams were practically free of disorders in the boundary zones and showed no noticeable shrinkage during the cooling phase. For comparison, mixture 2 was dosed with 0.007 parts by weight. The resulting foam was free of disorders in the boundary zones. However, the cell structure was markedly refined and no longer corresponded to the slight irregular characteristic property of a typical cold foam. Moreover, the foam showed clear signs of shrinkage already after the cooling phase.

Mixture 2 was furthermore dosed with 0.014 and 0.021 parts by weight respectively. The volume of the resulting foam decreased by more than 30% as a result of appreciable shrinkage during the cooling phase.

EXAMPLE 5

Molded foams were produced on the basis of the basic formulation of Example 4. A high-pressure foaming machine was used for the purpose, in which the components were mixed by counter-current spraying in the mixing head. Foaming was carried out using two separate streams of chemicals. The isocyanate mixture was conveyed by one stream and all the remaining chemicals, which had previously been intimately mixed in a stirring apparatus fitted with a stirring disc, by the other.

The mold implement was made of epoxy resin and had a molding nest shaped in the form of a cylinder with a volume of 18,000 cm³. Before each trial foaming, the mold was preheated to 45° C and sprayed with a conventional commercial release agent.

The reactive mass, introduced for each foaming, had the total weight of 900 g, corresponding to a feed performance of 292 g isocyanate mixture per mold filling.

In regard to the siloxane, mixtures 1 to 2 of Example 4 were used in the percentage amounts given there. Additions of mixture 1, that conform to the invention, gave satisfactory molded foams, without any structural defects. All three foams were remarkable in that they could be injected with little expenditure of energy and that they showed excellent elasticity after a simple, light fulling.

The comparison foam, which was produced with 0.007 parts by weight of mixture 2 relative to 100 parts by weight of polyol, gave a very tight to slightly bloated molding which showed no boundary disorders, yet opposed the compression procedures with considerable resistance. It had to be filled with a great expenditure of energy so that mechanical damage to the molding could only be avoided by great care.

The foams, in whcih the siloxane mixture 2 was dosed with 0.014 and 0.021 parts by weight relative to 100 parts by weight of polyol, already had such an extremely closed cell structure that pressure equilization through the venting possibilities of the mold could only still be effected in highly localized manner so that, as the mold was opened, the molding pulled apart because of too high an internal pressure.

In further foamings, it was now attempted to produce a molded foam, that satisfied the technical requirements, by decreasing the amount of mixture 2 that was introduced. This did not succeed in a sufficiently reproducible manner.

On dosing with 0.0015 parts by weight of mixture 2, the compression behavior of the foams was satisfactory. However, the foam structure already clearly showed disorders in the boundary zones.

On dosing with 0.0025 parts by weight of mixture 2, the compression already caused problems in five of seven trial foamings because of the increased closed-cell nature and proved to be difficult technically. Of the remaining two foams, one was satisfactory and the other showed structure disorders in the boundary zone.

From this extensive series of experiments, it can be learned that:

a. the selection rules confirming to the invention, must be strictly adhered to since the proportion of siloxanes outside the scope of the invention in mixture 2 amounted to only 3.2% and b. the balance between the desired regulating effect in the boundary zone and the increase of the undesirable shrinkage tendency, is displaced so far by the composition of the siloxane in favor of the tendency to shrink, that there is no longer any leeway beyond the selection rules disclosed here, if the production procedure is to be reliable.

EXAMPLE 6

Two siloxanes conforming to formula I are isolated with 97–98% purity by fractional distillation of a siloxane mixture equilibriated with sulfuric acid. Siloxane 1 corresponded to a chain that was formed from 8 silicon atoms. All $R^1$ and $R^2$ substituents were methyl groups.

Siloxane 2 also corresponded to a chain that was formed from 8 silicon atoms. However, two of the 18 substituents $R^1$ and $R^2$ were phenyl and only 16 substituents were methyl.

The distribution of the two phenyl groups within the chain must be regarded as statistical, since an analytical possibility of differentiation in regard to the expected isomer mixture is no longer assured. However, substitution at the terminal silicon atoms is excluded.

Both siloxanes were examined by foamings according to the method of Example 1 and the basic formulation from Example 4.

At applications concentrations of 0.003 to 0.006 parts by weight per 100 parts by weight of foaming polyol, siloxane 1 gave a foam that was free of distortion and without noticeable tendency to shrink whereas, with siloxane 2, this was the case only for concentrations of 0.006 parts by weight per 100 parts by weight of foaming polyol, while, with 0.003 parts by weight of siloxane 2, the boundary distortions were not yet eliminated in an adequate manner.

EXAMPLE 7

An $\alpha,\Omega$-dichlorodimethylsiloxane, with 9 silicon atoms in the chain, was obtained in 98% purity by fractional distillation of an equilibrated oligomer mixture based on cyclic dimethylsiloxanes and dimethyldichlorosilane. This siloxane was reacted with ethyleneglycolmonopropylether in an acid-splitting condensation reaction. A compound was synthesized that, in relation to formula I, corresponded to a composition of $n = 7$, $R^1 = CH_3$ and $R^2 = CH_3-CH_2-CH_2-O-CH_2-CH_2-O-$.

By the addition of 0.004 parts by weight of this compound and in conformity with the basic formulation given in Example 4, a satisfactory foam was obtained according to the foaming procedure of Example 1, that showed no boundary distortions whatsoever and did not shrink noticeably.

Analogous foaming but without addition of siloxane yielded a foam which, closely adjacent its skin, exhibited on all six surfaces a coarser cell structure. individual cells were partly so large that their diameter clearly exceeded 1 cm.

EXAMPLE 8

An equilibrated siloxane mixture, consisting of hexamethyldisiloxane, octamethylcyclotetrasiloxane and tetramethylcyclotetrasiloxane, after being washed neutral with $H_2O/NaHCO_3$ and dried azeotropically with benzene, was reacted using $H_2PtCl_6$ as catalyst with allyl acetate.

By fractional distillation, a compound conforming to formula I was isolated, whose chain length corresponded to $n = 7$ with $R^2 =$ methyl. 17 of the remaining 18 substituents $R^1$ were methyl groups and one substituent the γ-acetoxypropyl group. This substituent is at a silicon atom in that part of the molecule which is within the brackets. A more exact loclization or definition of the assumed mixture of isomers is not possible for technical reasons. By gas-chromatographic inspection, the eliminated compound showed itself to be more than 96% chemically pure.

Analogously to Example 7, the effectiveness of the inventive compound was investigated by foamings. Foams, with satisfactory cell structure and with no shrinkage tendency worth mentioning, could be obtained while varying the applied amount of inventive siloxane from 0.003 to 0.009 parts by weight per 100 parts by weight of foaming polyol. Since a margin of safety of at least 300% was obtained hereby, the experimental series was discontinued.

What we claim is:

1. In a process of producing cold cure soft polyurethane foams, wherein polyethers having at least two hydroxy groups per molecule, water and organic polyisocyanate are foamed in the presence of catalysts, the foaming system optionally comprising cross-linkers, blowing agents and/or other auxiliaries, the improvement which comprises adding to the foaming system organopolysiloxane of the formula I

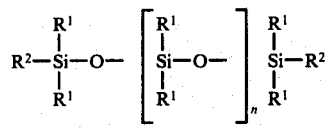

wherein $R^1$ represents the same of different unsubstituted or substituted hydrocarbon groups which are devoid of groups that have a tendency to enter addition reactions with isocyanate;

$R^2$ has the same meaning as $R^1$ or is $OR^3$, wherein
  $R^3$ represents alkyl, aryl, alkaryl or $[C_mH_{2m}O]_pR^4$,
  $R^4$ being lower alkyl,
  $m = 2$ to 4 and
  $p$ being selected such that the mole weight of the total $R^3$ group does not exceed 400; and
  $n = 2$–10 and wherein essentially none of the individual components of the mixtures possess a value of $n > 10$, the amount of the compound of formula I being between about [0,003] 0.003 to 2% by weight calculated on the amount of polyether in the foaming system.

2. The improvement of claim 1, wherein the hydrocarbon groups of $R^1$ are devoid of —OH, —SH and >NH.

3. The improvement of claim 1, wherein $p$ is chosen such that the mole weight of the total $R^3$ group does not exceed 150.

4. The improvement of claim 1, wherein $R^1$ is methyl, $R^2 = R^1$ or alkoxy of 1 to 4 carbon atoms and $n = 2$ to 6.

5. The improvement of claim 1, wherein at least 90% of all $R^1$ groups are methyl.

6. The improvement of claim 1, wherein all $R^1$ groups are methyl.

7. The improvement of claim 1, wherein $R^1$ is selected from the group consisting of n-alkyl of 2–18 carbon atoms, iso-alkyl of 2–18 carbon atoms, phenyl, vinyl, halogenalkyl, acetoxypropyl, 2-cyanoethyl, 3-cyanopropyl and hydrogen.

8. The improvement of claim 7, wherein the halogenalkyl is bromomethyl, chloromethyl, 2-chloroethyl or 3-chloropropyl.

9. The improvement of claim 1, wherein one $R^1$ group per average molecule is represented by $O_{\frac{1}{2}}$, the saturation of the residual valence being effected by a corresponding valence of another molecule, the total number of Si-atoms per molecule not exceeding 12.

10. The improvement of claim 1, wherein $R^2 = R^1 = CH_3$ or lower alkoxy of 1–6 carbon atoms.

11. The improvement of claim 1, wherein $n = 2$–8.

12. The improvement of claim 1, wherein the compound of formula I comprises 6–8 silicon atoms per molecule.

13. The improvement of claim 9, wherein the total number of silicon atoms does not exceed 8.

* * * * *